(12) United States Patent
Zheng et al.

(10) Patent No.: US 9,450,856 B2
(45) Date of Patent: Sep. 20, 2016

(54) EXPANDING MEMBER PORTS OF A LINK AGGREGATION GROUP BETWEEN CLUSTERS

(71) Applicant: Hangzhou H3C Technologies Co., Ltd., Hangzhou (CN)

(72) Inventors: Guoliang Zheng, Beijing (CN); Liang Chen, Beijing (CN)

(73) Assignee: HANGZHOU H3C TECHNOLOGIES CO., LTD., Hangzhou, Zhejiang (CN)

( * ) Notice: Subject to any disclaimer, the term of this patent is extended or adjusted under 35 U.S.C. 154(b) by 0 days.

(21) Appl. No.: 14/352,940

(22) PCT Filed: Dec. 20, 2012

(86) PCT No.: PCT/CN2012/086979
§ 371 (c)(1),
(2) Date: Apr. 18, 2014

(87) PCT Pub. No.: WO2013/097639
PCT Pub. Date: Jul. 4, 2013

(65) Prior Publication Data
US 2014/0301404 A1    Oct. 9, 2014

(30) Foreign Application Priority Data
Dec. 26, 2011    (CN) .......................... 2011 1 0447791

(51) Int. Cl.
*H04L 12/751* (2013.01)
*H04L 12/709* (2013.01)
(Continued)

(52) U.S. Cl.
CPC ................ *H04L 45/02* (2013.01); *H04L 1/22* (2013.01); *H04L 45/245* (2013.01); *H04L 49/15* (2013.01); *H04L 69/14* (2013.01); *H04L 45/04* (2013.01); *Y02B 60/33* (2013.01)

(58) Field of Classification Search
CPC ....... H04L 1/22; H04L 69/14; H04L 47/125; H04L 49/15; H04L 47/41; H04L 45/02

USPC ............ 370/252, 254, 398–399, 395.3, 409, 370/424
See application file for complete search history.

(56) References Cited

U.S. PATENT DOCUMENTS

| 6,363,077 B1 | 3/2002 | Wong et al. |
| 6,910,149 B2 | 6/2005 | Perloff et al. |

(Continued)

FOREIGN PATENT DOCUMENTS

| CN | 1809022 | 7/2006 |
| CN | 101102222 | 1/2008 |

(Continued)

OTHER PUBLICATIONS

International Search Report and Written Opinion dated Mar. 28, 2013 issued on PCT Patent Application No. PCT/CN2012/086979 filed on Dec. 20, 2012, The State Intellectual Property Office, P.R. China.

(Continued)

*Primary Examiner* — Redentor Pasia
(74) *Attorney, Agent, or Firm* — Hewlett Packard Enterprise Patent Department

(57) ABSTRACT

According to an example, in a method and an apparatus for expanding member ports of a link aggregation group between clusters, each apparatus in a cluster receives a port joining link aggregation group message sent by a master control board on a master apparatus in the cluster. In response to an apparatus determining that a newly joined port is a port on the apparatus itself and also is the first member port in the link aggregation group of the cluster, the newly joined port is associated with the link aggregation group. By applying the method and the apparatus for expanding member ports of a link aggregation group between clusters in this manner, according to an example, the number of member links in the link aggregation group between clusters is able to be increased, and the robustness of the network interconnection between clusters is also able to be enhanced.

15 Claims, 5 Drawing Sheets

(51) Int. Cl.
*H04L 12/933* (2013.01)
*H04L 29/06* (2006.01)
*H04L 1/22* (2006.01)
*H04L 12/715* (2013.01)

(56) References Cited

U.S. PATENT DOCUMENTS

| | | | |
|---|---|---|---|
| 7,639,605 B2* | 12/2009 | Narayanan et al. | 370/219 |
| 7,881,230 B2* | 2/2011 | Vinayagam et al. | 370/255 |
| 2007/0081557 A1* | 4/2007 | Binetti et al. | 370/469 |
| 2008/0301319 A1* | 12/2008 | Dernosek et al. | 709/232 |
| 2010/0097926 A1 | 4/2010 | Huang et al. | |
| 2010/0182933 A1* | 7/2010 | Hu et al. | 370/254 |
| 2010/0290472 A1* | 11/2010 | Raman et al. | 370/395.2 |
| 2011/0161489 A1* | 6/2011 | Bhatt et al. | 709/224 |
| 2011/0258346 A1* | 10/2011 | Said et al. | 709/249 |
| 2012/0236859 A1* | 9/2012 | Subramanian et al. | 370/392 |

FOREIGN PATENT DOCUMENTS

| | | |
|---|---|---|
| CN | 101286899 | 10/2008 |
| CN | 101483593 | 7/2009 |
| CN | 101577717 | 11/2009 |
| CN | 101931587 | 12/2010 |
| CN | 101986626 | 3/2011 |
| CN | 102104488 | 6/2011 |

OTHER PUBLICATIONS

Lu et al., Abstract on "Research on preemptive support of port selection logic mechanism for link aggregation group", Feb. 2011, pp. 114-118, vol. 39 No. 1, Journal of Zhejiang University of Technology, China.
Extended European Search Report dated Jul. 16, 2015, EP Patent Application No. 12863542.2 filed Dec. 20, 2012, European Patent Office.

* cited by examiner

EXPANDING MEMBER PORTS OF A LINK AGGREGATION GROUP BETWEEN CLUSTERS

BACKGROUND

In a link aggregation group, two or more data channels are combined into a single channel and appear as a single logical link with higher bandwidth. A link aggregation group is generally used to connect one or more devices having great demands for bandwidth, such as servers or server clusters connecting a backbone network. When clusters are connected with a link aggregation group, data traffic reaches the other side through a member link in the link aggregation group by way of load sharing. When one member link fails, data traffic, which is borne by the failed member link will be switched to the remaining member links in the link aggregation group.

BRIEF DESCRIPTION OF THE DRAWINGS

Features of the present disclosure are illustrated by way of example and not limited in the following figure(s), in which like numerals indicate like elements, in which.

DETAILED DESCRIPTION

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

Usually, the number of member links in a link aggregation group of a cluster is strictly limited by the capacities of hardware chips of apparatuses in the cluster (i.e., the number of member ports to be joined into the link aggregation group allowed by the hardware chip). For example, if the maximum number of ports provided by a device in a cluster is N, then the maximum number of member links in a link aggregation group between the cluster and the other cluster also is N, and could not be able to achieve the desired 4*N.

In contrast to the above, examples of the present disclosure provide a method for expanding member ports of a link aggregation group between clusters, which may increase the number of member links in a link aggregation group between clusters, and enhance the robustness of the network interconnection between clusters.

Examples of the present disclosure also provide an apparatus for expanding member ports of a link aggregation group between clusters, which may increase the number of member links in a link aggregation group between clusters, and enhance the robustness of the network interconnection between clusters.

Figure 1:
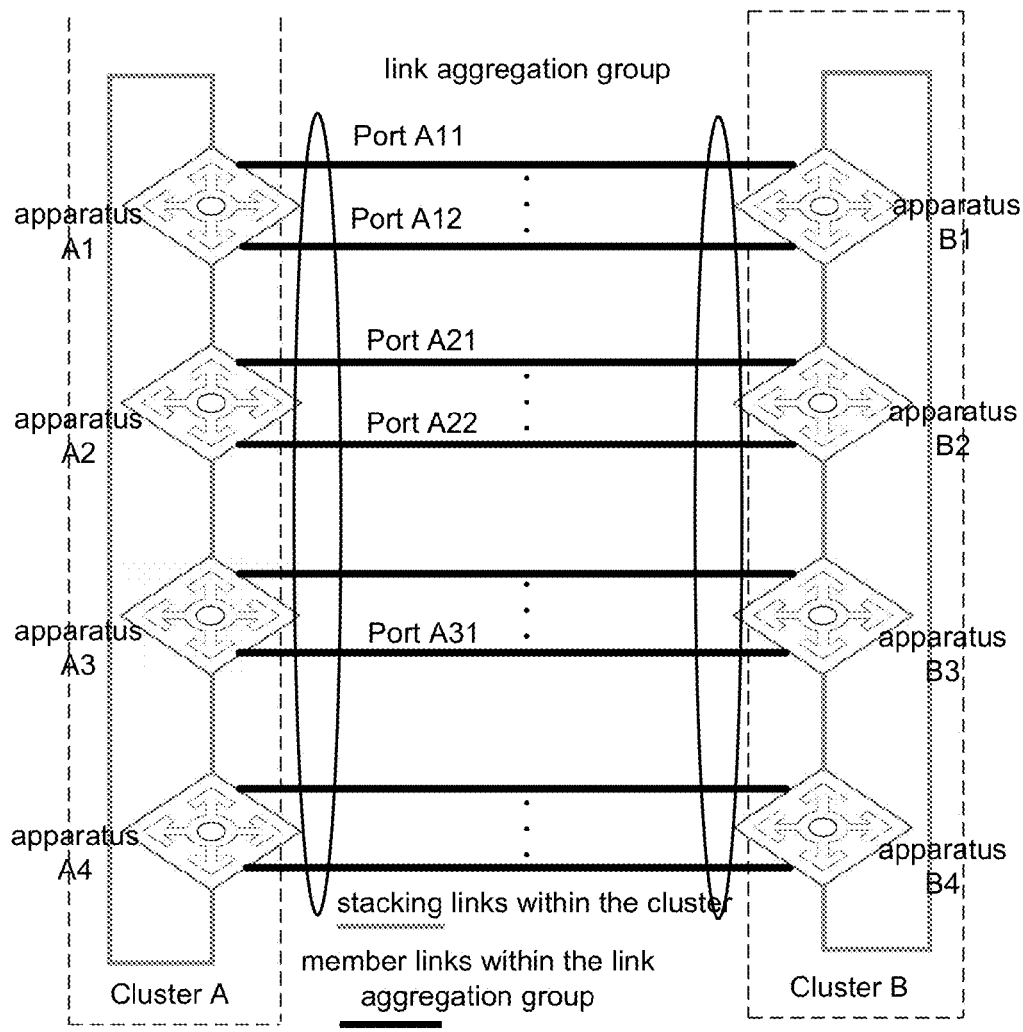
FIG. 1 is a schematic diagram illustrating a structure of a link aggregation group between clusters according to an example of the present disclosure.

FIG. 1 is a schematic diagram illustrating a structure of a link aggregation group between clusters according to an example of the present disclosure. The specific process of the above flowchart will be described hereinafter with reference to FIG. 1.

1. Initially, a link aggregation group between a cluster A and a cluster B (assuming it is the link aggregation group 1) does not have any member port, i.e., none of the ports of apparatus A1-A4 have joined into the link aggregation group 1. At this point, when a packet enters the cluster A from the apparatus A1, as no member port has joined into the link aggregation group 1, the packet is discarded.

2. When a port A31 joins in the link aggregation group 1, a master control board (usually located on a master apparatus in the cluster) notifies, in a distributed manner, each apparatus in the cluster A with a port joining link aggregation group message:

1) on apparatus A1, as port A31 does not belong to apparatus A1 and there are not any ports on apparatus A1 that have already been joined into the link aggregation group 1, a stacking port of the apparatus A1 that connects with a stacking link directly connecting with apparatus A2 (or apparatus A4) is associated with the link aggregation group 1;

2) on apparatus A2, as port A31 does not belong to apparatus A2 and there are not any ports on apparatus A2 that have been joined into the link aggregation group 1 either, a stacking port of the apparatus A2 that connects with a stacking link directly connecting with apparatus A3 (or apparatus A1) is associated to the link aggregation group 1;

3) on apparatus A3, as port A31 belongs to apparatus A3, and it is the first port to be joined into the link aggregation group 1 on apparatus A3. At the same time, it is also the first member port of the link aggregation group 1 in cluster A, the port A31 is associated to the link aggregation group 1;

4) on apparatus A4, as port A31 does not belong to apparatus A4 and there are not any ports on apparatus A4 that have been joined into the link aggregation group 1 either, a stacking port of the apparatus A4 that connects with a stacking link directly connecting with apparatus A3 (or apparatus A1) is associated to the link aggregation group 1.

At this time, when a packet enters apparatus A1, the apparatus A1 looks up the DMAC address of the received packed, determines the DMAC address associated to the link aggregation group 1 and forwards the received packet through the stacking port on apparatus A1. When a packet is received at apparatus A2, on apparatus A2, a MAC address table is looked up again and if an output port is still the link aggregation group 1, the packet is transmitted to apparatus A3 through the stacking port on apparatus A2. Thus on apparatus A3, the MAC address table is looked up again, and if the output port corresponding to the DMAC address of the received packet is still link aggregation group 1, and at this time the port A31 of apparatus A3 is in link aggregation group 1, then the packet is transmitted to cluster B through the port A31.

3. When a port A21 joins in the link aggregation group 1, the master control board notifies, in a distributed manner, each apparatus in the cluster A with the member port joining link aggregation group message. The message not only includes the port A21 to be joined into the link aggregation group 1 this time, but also the port A31 that has already been joined into the link aggregation group 1 (from this the port to be joined into the link aggregation group 1 currently may be determined as port A21):

1) on apparatus A1, as port A21 does not belong to apparatus A1, and the stacking on the apparatus A1 has already been associated with the link aggregation group 1, it does not need to handle the message;
2) on apparatus A2, as the newly joined port A21 is the first port on the apparatus A2 that joins the link aggregation group 1, but it is not the first member port of the link aggregation group 1 in cluster A, a logic association between the stacking port of the apparatus A2 and the link aggregation group 1 is replaced with a logic association between the port A21 and the link aggregation group (hereafter, traffic whose output port is link aggregation group 1 in apparatus A2 is sent to cluster B through port A21);
3) on apparatus A3, as the newly joined port A21 does not belong to apparatus A3, and the port A31 on the apparatus A3 has already been joined into the link aggregation group 1 already, it does not need to handle the message;
4) on apparatus A4, as the newly joined port A21 does not belong to apparatus A4, and the stacking port on the apparatus A4 that connects the stacking link directly connecting with apparatus A3 (or A1) has already been associated with the link aggregation group 1, it does not need to handle the message.

At this time, when a packet is received at apparatus A1, as the stacking port of apparatus A1 is associated with the link aggregation group 1 and the output port corresponding to the DMAC address of the received packet is the link aggregation group 1, the received packet is forwarded to the apparatus A2 through the stacking port of apparatus A1. On apparatus A2, the MAC address table is looked up again, due to the output port corresponding DMAC address of the packet is still link aggregation group 1, and at this time the port 21 of apparatus A2 has joined into the link aggregation group 1, then the packet is transmitted to cluster B through the port A21.

4. When a port A22 joins in the link aggregation group 1, the master control board notifies each apparatus, in a distributed manner, in the cluster A with the member port joining link aggregation group message. The message includes not only the port A22 to be joined into the link aggregation group 1 this time, but also the ports A31 and A21 that have already been joined into the link aggregation group 1:

1) on apparatus A1, as the above port A22 does not belong to apparatus A1, and the stacking port of the apparatus A1 has already been associated with the link aggregation group 1 in step 2, it does not need to handle the message;
2) on apparatus A2, as the newly joined port A22 is the second port on the apparatus A2 that has joined the link aggregation group, the port A22 is associated with the link aggregation group 1 directly (hereafter, traffic whose output port is link aggregation group 1 in apparatus A2 is sent to cluster B through port A21 or port A22);
3) on apparatus A3, as port A22 does not belong to apparatus A3, and the port A31 on the apparatus A3 has already been joined into the link aggregation group 1, it does not need to handle the message;
4) on apparatus A4, as the newly joined port A22 does not belong to apparatus A4, and the stacking port of the apparatus A4 has already been associated with the link aggregation group 1 already, it does not need to handle the message.

At this time, when a packet enters apparatus A1, as the stacking port of the apparatus A1 is associated with the link aggregation group 1 and the output port corresponding to the DMAC address of the received packet is the link aggregation group 1, the received packet is transmitted to the apparatus A2 through the stacking port of the apparatus A1. On apparatus A2, the MAC address table is looked up again and if the output port corresponding to the DMAC address of the packet is still link aggregation group 1, and at this time the ports A21 and A22 of apparatus A2 have joined into the link aggregation group 1, then one port is selected from the ports A21 and A22 according to a result of hashing source media access control (SMAC) address and destination media access control (DMAC) address in the packet then modulo 2 (2 is the number of member ports of apparatus A2 in link aggregation group 1), and the packet is transmitted to cluster B through the selected port.

5. When a port A11 joins in the link aggregation group 1, the master control board notifies each apparatus in the cluster A, in a disturbed manner, with the member port joining link aggregation group message. The message includes not only the port A11 to be joined into the link aggregation group 1 this time, but also the ports A31, A21, and A22 that have already been joined into the link aggregation group 1:

1) on apparatus A1, as the newly joined port A11 is the first port on the apparatus A1 that joins the link aggregation group 1 on apparatus A1, the logic association between the stacking port of the apparatus A1 and the link aggregation group 1 is replaced with a logic association between the port A11 and the link aggregation group 1 (hereafter, traffic whose output port is link aggregation group 1 in apparatus A1 is sent to cluster B through port A11);
2) on apparatus A2, as the newly joined port A11 does not belong to apparatus A2, and the ports A21 and A22 on the apparatus A2 have already been joined into the link aggregation group 1, it does not need to handle the message;
3) on apparatus A3, as the newly joined port A11 does not belong to apparatus A3, and the port A31 on the apparatus A3 has already been joined into the link aggregation group 1, it does not need to handle the message;
4) on apparatus A4, as the newly joined port A11 does not belong to apparatus A4, and the stacking port of the stacking link, which is directly connected with apparatus A3 (or A1) on the apparatus A4 has already been associated to the link aggregation group 1, it does not need to handle the message.

At this time, when a packet enters apparatus A1, as the port A11 of apparatus A1 has been joined into the link aggregation group 1 and the output port corresponding to the DMAC address of the received packet is the link aggregation group 1, the packet is transmitted to cluster B through the port A11.

6. When a port A12 joins in the link aggregation group 1, the master control board notifies each apparatus in the cluster A, in a distributed manner, with the member port joining link aggregation group message. The message includes not only the port A12 to be joined into the link aggregation group 1 this time, but also the ports A31, A21, A22 and A11 that have already been joined into the link aggregation group 1:

1) on apparatus A1, as the newly joined port A12 is second port on the apparatus A1 that joins into the link aggregation group 1, the port A12 is associated to the link aggregation group 1 (hereafter, the apparatus A1 sends traffic of which output port is the link aggregation group 1 to cluster B through port A11 or port A12);
2) on apparatus A2, as the newly joined port A12 does not belong to apparatus A2, and the ports A21 and A22 on the apparatus A2 have already been joined into the link aggregation group 1, it does not need to handle the message;
3) on apparatus A3, as the newly joined port A12 does not belong to apparatus A3, and the port A31 on the apparatus A3 has already been joined into the link aggregation group 1, it does not need to handle the message;
4) on apparatus A4, as the newly joined port A12 does not belong to apparatus A4, and the stacking port of the stacking link, which is directly connected with apparatus A3 (or A1) on apparatus A4 has already been associated to the link aggregation group 1 in step 2, it does not need to handle the message.

At this time, when a packet of which the DMAC address associates with link aggregation group 1 enters apparatus A1, as the ports port A11 and port A12 on the apparatus A1 have already joined the link aggregation group 1, then one port is selected from the ports A11 and A12 according to a result of hashing SMAC and DMAC in the packet then modulo 2 (2 is the number of member ports of apparatus A1 in link aggregation group 1), and the packet is transmitted to cluster B through the selected port.

The rest may be done in the same manner, until all ports on each apparatus in cluster A are joined into the link aggregation group 1.

As may be seen from the above analysis, when a port on an apparatus in a cluster joins in a link aggregation group, a determination is made as to whether the port joined into the link aggregation group belongs to the apparatus itself, and the port belonging to the apparatus would be associated to the link aggregation group. Therefore, for the cluster, all of the ports of all of the apparatuses are able to be joined into the link aggregation group. Taking cluster A as an example, if the maximum number of ports provided by an apparatus in the cluster A is N, then the number of member links in the link aggregation group of the cluster A will be able to achieve the desired 4*N.

Figure 2:
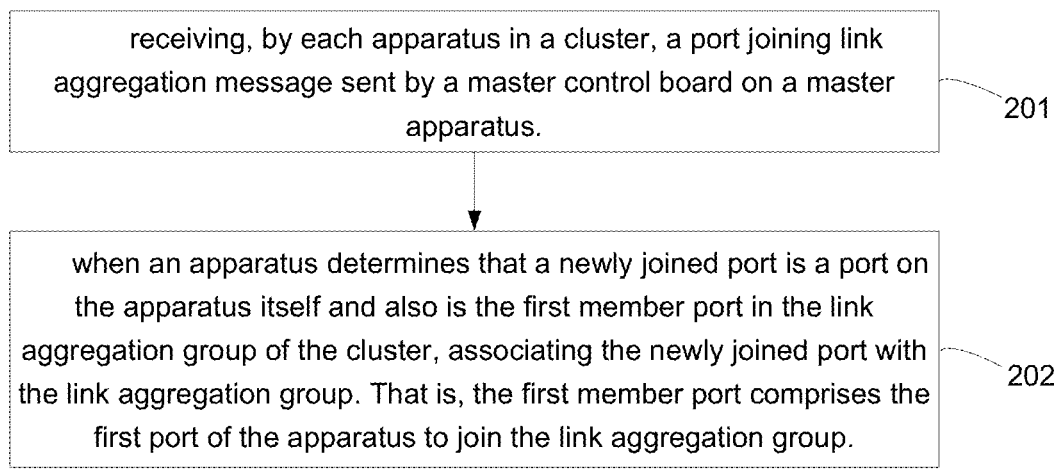
FIG. 2 is a flowchart illustrating a method for expanding member ports of a link aggregation group between clusters according to an example of the present disclosure.

FIG. 2 is a flowchart illustrating a method for expanding member ports of a link aggregation group between clusters according to an example of the present disclosure. As shown in FIG. 2, the method includes the following operations.

At block 201: receiving, by each apparatus in a cluster, a port joining link aggregation group message sent by a master control board on a master apparatus.

At block 202: when an apparatus determines that a newly joined port is a port on the apparatus itself and also is the first member port in the link aggregation group of the cluster, associating the newly joined port with the link aggregation group. That is, the first member port comprises the first port of the apparatus to join the link aggregation group.

Figure 3:
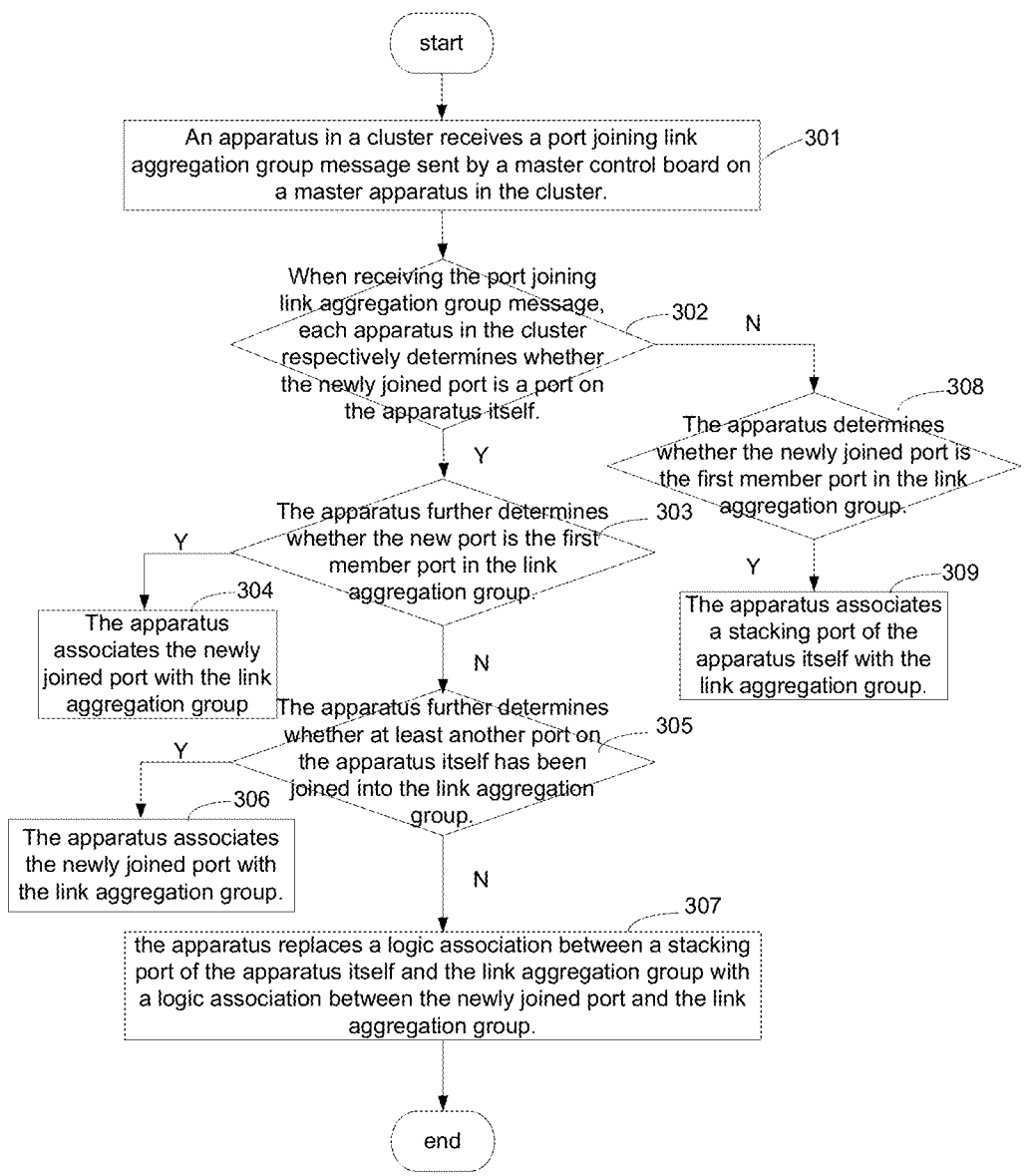
FIG. 3 is a flowchart illustrating a method for expanding member ports of a link aggregation group between clusters according to an example of the present disclosure.

FIG. 3 is a flowchart illustrating a method for expanding member ports of a link aggregation group between clusters according to an example of the present disclosure. As shown in FIG. 3, the method includes the following operations.

At block 301: an apparatus in a cluster receives a port joining link aggregation group message sent by a master control board on a master apparatus in the cluster.

When a port on any apparatus in the cluster joins a link aggregation group, a master control board on a master apparatus in a cluster sends a port joining link aggregation group message to each apparatus in the cluster.

At block 302: when receiving the port joining link aggregation group message, each apparatus in the cluster respectively determines whether the newly joined port is a port on the apparatus itself. If any of the apparatuses determines that the newly joined port is a port on the apparatus itself, then block 303 is performed; otherwise, block 308 is performed.

At block 303: the apparatus further determines whether the new port is the first member port in the link aggregation group. If it is determined that the newly joined port is the first member port in the link aggregation group, then block 304 is performed; otherwise, block 305 is performed.

At block 304: the apparatus associates the newly joined port with the link aggregation group.

At block 305: the apparatus further determines whether at least another port on the apparatus itself has been joined into the link aggregation group. If it is determined that at least one port on the apparatus has been joined into the link aggregation group, then block 306 is performed; otherwise, block 307 is performed.

At block 306: the apparatus associates the newly joined port with the link aggregation group.

At block 307: the apparatus replaces a logic association between a stacking port of the apparatus itself and the link aggregation group with a logic association between the newly joined port and the link aggregation group.

At block 308: the apparatus determines whether the newly joined port is the first member port in the link aggregation group. If it is determined that the newly joined port is the first member port in the link aggregation group, then block 309 is performed; otherwise, the apparatus does not change the logic association between the stacking port and the link aggregation group.

At block 309: the apparatus associates a stacking port of the apparatus itself with the link aggregation group, the workflow is finished.

At this point, the description of the whole flowchart illustrating the method for expanding member ports of the link aggregation group between clusters according to the example of the present disclosure is completed.

After the member ports of a link aggregation group between clusters are expanded, packets will be forwarded through the member ports of the link aggregation group, which includes the following operations.

An apparatus receiving a packet determines whether there is a port of the apparatus in the link aggregation group. If there is a port of the apparatus in the link aggregation group, then the packet is directly transmitted through the above port of the apparatus in the link aggregation group. If there is not a port of the apparatus in the link aggregation group, then the packet is transmitted through a stacking port of the apparatus that is associated with the link aggregation group and connects with a stacking link connecting with the other apparatus in the cluster.

Figure 4:
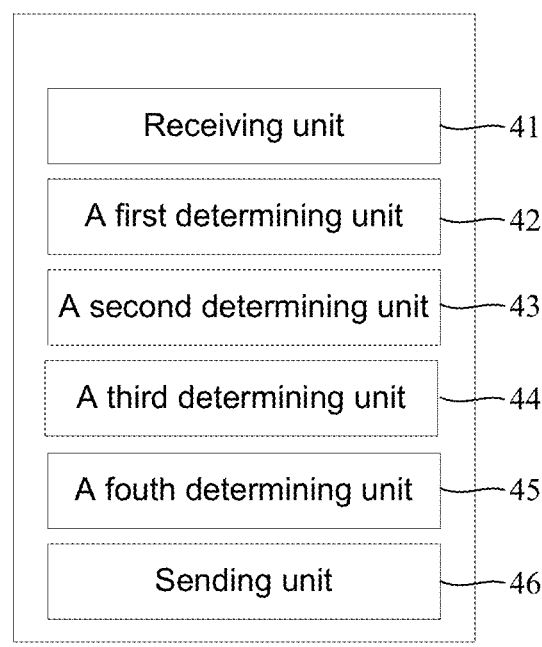
FIG. 4 is a schematic diagram illustrating a structure of an apparatus for expanding member ports of a link aggregation group between clusters according to an example of the present disclosure.

Based on the above method, FIG. 4 provides a schematic diagram illustrating a structure of an apparatus for expanding member ports of a link aggregation group between clusters according to an example of the present disclosure. As shown in FIG. 4, the apparatus includes a receiving unit 41 and a first determining unit 42. Herein, the receiving unit 41 is to receive a port joining link aggregation group message sent by a master control board on a master apparatus in the cluster. The first determining unit 42 is to associate the port joined into the link aggregation group with the link aggregation group when it is determined that the port joined into the link aggregation group is a port on the apparatus itself and also is the first port in the link aggregation group connecting the cluster.

As shown in FIG. 4, the apparatus may further include a second determining unit 43, which is to associate a stacking port of the apparatus itself with the link aggregation group when it is determined that the port the port joined into the link aggregation group is a port on the other apparatus in the cluster and is the first port in the link aggregation group, wherein, the stacking port of the apparatus is connected to a stacking link that directly connects with the other apparatus in the cluster.

Furthermore, the apparatus may also include a third determining unit 44, which is to replace an association between the stacking port and the link aggregation group with an association between the port joined into the link aggregation group and the link aggregation group when it is determined that the port joined into the link aggregation group is the first port on the apparatus itself that joins the link aggregation group and at least one port on the other apparatus has joined into the link aggregation group.

Furthermore, the apparatus may also include a fourth determining unit 45, which is to associate the port joined into the link aggregation group with the link aggregation group when it is determined that the port joined into the link aggregation group is a port on the apparatus itself and at least another port on the apparatus itself has been joined to the link aggregation group.

Furthermore, the apparatus may also include a sending unit 46, which is to transmit the packet through the port of the apparatus itself in the link aggregation group when it is determined that the DMAC address of the received packet corresponds to the link aggregation group and at least one port of the apparatus itself has joined into the link aggregation group; or, to transmit the packet through the stacking port when it is determined that the DMAC address of the received packet corresponds to the link aggregation group and the stacking port of the apparatus is associated with the link aggregation group.

The above-mentioned units may be implemented by software (e.g., machine readable instructions stored in a memory and executable by a processor), hardware (e.g., the processor of an ASIC), or a combination thereof, which is not restricted by the examples of the present disclosure discussed herein.

Figure 5:
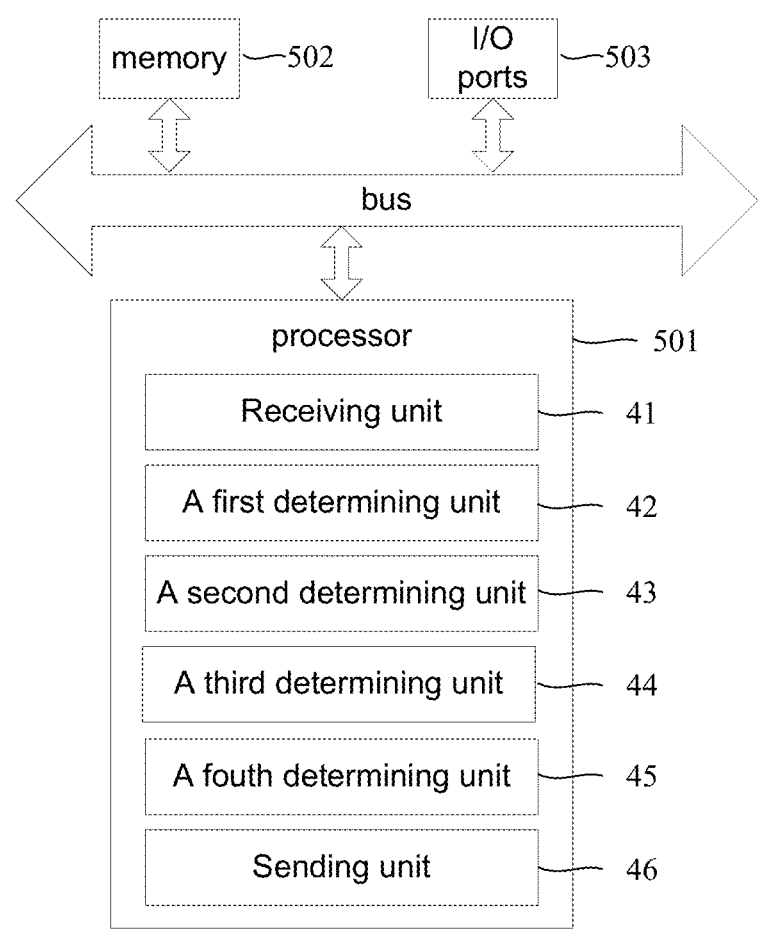
FIG. 5 is a schematic diagram illustrating a hardware structure of an apparatus for expanding member ports of a link aggregation group between clusters according to an example of the present disclosure.

FIG. 5 is a schematic diagram illustrating a hardware structure of an apparatus for expanding member ports of a link aggregation group between clusters according to an example of the present disclosure. As shown in FIG. 5, the apparatus includes a processor 501 and a memory 502. Wherein, the memory 502 stores machine readable instructions and the processor 501 performs operations through execution of the machine readable instructions. The machine readable instructions are to cause the processor to receive a port joining link aggregation group message sent by a master control board on a master apparatus in the cluster and associate a newly joined port with the link aggregation group when it is determined that the newly joined port is a port on the apparatus itself and also is the first member port in the link aggregation group connecting the cluster.

Furthermore, the machine readable instructions may further cause the processor 501 to associate a stacking port of the apparatus itself with the link aggregation group when it is determined that the newly joined port is a port on the other apparatus in the cluster and also is the first member port in the link aggregation group, in which, the stacking port of the apparatus is connected to a stacking link that directly connects with the other apparatus in the cluster.

Furthermore, the machine readable instructions may further cause the processor 501 to replace an association between the stacking port and the link aggregation group with an association between the newly joined port and the link aggregation group when it is determined that the newly joined port is the first port on the apparatus itself that joins the link aggregation group and at least one port on the other apparatus has joined into the link aggregation group.

Furthermore, the machine readable instructions may further cause the processor 501 to associate the newly joined port with the link aggregation group when it is determined that the newly joined port is a port on the apparatus itself and at least another port on the apparatus itself has been joined to the link aggregation group.

Furthermore, the machine readable instructions may further cause the processor 501 to transmit the packet through the port of the apparatus itself that is in the link aggregation group when it is determined that the DMAC address of a received packet corresponds to the link aggregation group and at least one port of the apparatus itself has joined into the link aggregation group; or, transmit the packet through the stacking port when it is determined that that the DMAC address of a received packet corresponds to the link aggregation group and the stacking port of the apparatus is associated with the link aggregation group.

As may be seen from the above description, when the computer operations stored in the memory 502 are executed by the processor 501, functions of the receiving unit 41, the first determining unit 42, the second determining unit 43, the third determining unit 44, the fourth determining unit 45, and the sending unit 46 are implemented, then the structure of the apparatus for expanding member ports of a link aggregation group between clusters may be shown in FIG. 5, in which, the device shown in FIG. 5 further includes I/O ports 503.

Thus, the apparatus for expanding member ports of a link aggregation group between clusters according to the example of the present disclosure is achieved.

As in the methods provided by examples of the present disclosure, each apparatus in a cluster associates its ports joined into a link aggregation group with the link aggregation group or associates its stacking port with the link aggregation group when no port on it has joined into the link aggregation group. Therefore, for the cluster, when all of the ports of all of the apparatuses join the link aggregation group, a hardware chip on each apparatus maintains an association between the link aggregation group and its ports joined into the link aggregation group, which makes it possible to achieve a desired number of member links in the link aggregation group of the cluster.

The above examples may be implemented by hardware, software, firmware, or a combination thereof. For example, the various methods, processes, and functional modules described herein may be implemented by a processor (the term processor is to be interpreted broadly to include a CPU, processing unit, ASIC, logic unit, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules may be implemented as machine readable instructions executable by one or more processors, hardware logic circuitry of the one or more processors or a combination thereof. Further the teachings herein may be implemented in the form of a computer software product. The computer software product is stored in a non-transitory storage medium and comprises a plurality of instructions for making a computer device (which may be a personal computer, a server or a network device such as a router, switch, access point, etc.) implement the methods recited in the examples of the present disclosure.

The figures are only illustrations of an example, wherein the modules or procedure shown in the figures are not necessarily essential for implementing the present disclosure. The modules in the aforesaid examples may be combined into one module or further divided into a plurality of sub-modules.

The above are just several examples of the present disclosure, and are not used for limiting the protection scope of the present disclosure. Any modifications, equivalents, improvements, etc., made under the principle of the present disclosure, are all included in the protection scope of the present disclosure.

What is claimed is:

1. A method for expanding member ports of a link aggregation group between clusters, comprising:
    receiving, by each apparatus in a cluster of apparatuses, a port joining link aggregation group message sent by a master control board on a master apparatus in the cluster, wherein the port joining link aggregation group message identifies a port, which is on an apparatus in the cluster, that newly joined the link aggregation group; and
    at each apparatus of the cluster of apparatuses: identifying the newly joined port from the port joining link aggregation group message; determining whether the newly joined port is a port on the apparatus itself and whether the newly joined port is a first member port in the link aggregation group of the cluster; in response to determining the newly joined port is a port on the apparatus itself and is a first member port in the link aggregation group, storing an association of the newly joined port with the link aggregation group at the apparatus; receiving a packet for the link aggregation group; and based on the stored association, transmitting the packet to another cluster of apparatuses via the newly joined port.

2. The method of claim 1, further comprising:
    associating a stacking port of the apparatus with the link aggregation group in response to any of the apparatuses determining that the newly joined port is a port on another apparatus in the cluster and also is the first member port in the link aggregation group, wherein, a stacking port of the apparatus is connected to a stacking link that directly connects with the another apparatus in the cluster.

3. The method of claim 2, further comprising:
    replacing an association between the stacking port and the link aggregation group with an association between the newly joined port and the link aggregation group in response to any of the apparatuses determining that the newly joined port is the first port on the apparatus itself that joins the link aggregation group and at least one port on the other apparatus has joined into the link aggregation group.

4. The method of claim 1, further comprising:
    associating the newly joined port with the link aggregation group in response to any of the apparatuses determining that the newly joined port is a port on the apparatus itself and at least another port on the apparatus itself has been joined into the link aggregation group.

5. The method of claim 1, further comprising:
    in response to any of the apparatuses receiving a packet and determining that the destination media access control (DMAC) address of the received packet corresponds to the link aggregation group and at least one port of the apparatus itself has joined into the link aggregation group, transmitting the packet through the port of the apparatus itself that is associated with the link aggregation group; and
    in response to any of the apparatuses receiving a packet and determining that the DMAC address of the received packet corresponds to the link aggregation group and the stacking port of the apparatus is associated with the link aggregation group, transmitting the packet through the stacking port.

6. An apparatus for expanding member ports of a link aggregation group between clusters, said apparatus comprising:
    a processor; and
    a memory, wherein the memory stores machine readable instructions and wherein the processor performs operations through execution of the machine readable instructions, wherein the machine readable instructions are to:
    receive a port joining link aggregation group message sent by a master control board on a master apparatus in the cluster, wherein the link aggregation group message identifies a port, which is on an apparatus in the cluster, that newly joined the link aggregation group; and
    in response to a determination that the newly joined port is a port on the apparatus itself and also is a first member port in the link aggregation group of the cluster, store an association of the newly joined port with the link aggregation group at the apparatus; receive a packet for the link aggregation group; and based on the stored association, transmit the packet to another cluster of apparatuses via the newly joined port.

7. The apparatus of claim 6, wherein the machine readable instructions are further to:
    in response to a determination that the newly joined port is a port on the other apparatus in the cluster and also is the first member port in the link aggregation group, associate a stacking port of the apparatus itself with the link aggregation group, wherein the stacking port of the apparatus is connected to a stacking link that directly connects with the other apparatus in the cluster.

8. The apparatus of claim 7, wherein the machine readable instructions are further to:
    in response to a determination that the newly joined port is the first port on the apparatus itself that joins the link aggregation group and at least one port on the other apparatus has joined into the link aggregation group, replace an association between the stacking port and the link aggregation group with an association between the newly joined port and the link aggregation group.

9. The apparatus of claim 6, wherein the machine readable instructions are further to:
   in response to a determination that the newly joined port is a port on the apparatus itself and at least another port on the apparatus itself has been joined into the link aggregation group, associate the newly joined port with the link aggregation group.

10. The apparatus of claim 6, wherein the machine readable instructions are further to:
   in response to a determination that the DMAC address of a received packet corresponds to the link aggregation group and at least one port of the apparatus itself has joined into the link aggregation group, transmit the packet through the port of the apparatus itself that is associated with the link aggregation group; or,
   in response to a determination that the DMAC address of a received packet corresponds to the link aggregation group and the stacking port of the apparatus associate with the link aggregation group, transmitting the packet through the stacking port.

11. An apparatus comprising:
   a processor; and
   ports,
   wherein the processor:
      determines whether a port specified in a link aggregation group message received at the apparatus is a port of the apparatus;
      in response to determining the specified port is a port of the apparatus, determines whether the port is a first member port in the link aggregation group;
      in response to determining the port is the first member port in the link aggregation group, stores an association of the port with the link aggregation group at the apparatus; receives a packet for the link aggregation group; and based on the stored association, transmits the packet to a cluster of apparatuses via the port;
      in response to determining the port is not the first member port in the link aggregation group; determines whether any other ports of the apparatus are already a member of a link aggregation group; and
      in response to determining that none of the other ports of the apparatus are already a member of the link aggregation group, replaces, at the apparatus, a stacking port with the specified port in the link aggregation group.

12. The apparatus of claim 11, wherein the stacking port is one of the ports of the apparatus, and the stacking port indirectly connects the apparatus to a link in the link aggregation group.

13. The apparatus of claim 12, wherein the stacking port connects the apparatus to the link in the link aggregation group via another apparatus.

14. The apparatus of claim 13, wherein the apparatus and the another apparatus are in a cluster, and the cluster is connected to another cluster of apparatuses via links in the link aggregation group.

15. The apparatus of claim 11, wherein to replace the stacking port with the specified port in the link aggregation group, the processor replaces a stored association between the stacking port and the link aggregation group with an association between the specified port and the link aggregation group.

* * * * *